Oct. 25, 1966 J. R. HOOVER ETAL 3,281,710

MICROWAVE WIDE BAND INJECTION LOCK SYSTEM

Filed Oct. 2, 1964 4 Sheets-Sheet 1

INVENTORS.
JOSEPH R. HOOVER,
GEORGE SUSSEX,
BY J. K. Haskell
ATTORNEY.

Oct. 25, 1966 J. R. HOOVER ETAL 3,281,710

MICROWAVE WIDE BAND INJECTION LOCK SYSTEM

Filed Oct. 2, 1964 4 Sheets-Sheet 2

INVENTORS.
JOSEPH R. HOOVER,
GEORGE SUSSEX,
BY J. K. Haskell
ATTORNEY.

MICROWAVE WIDE BAND INJECTION LOCK SYSTEM

Filed Oct. 2, 1964 4 Sheets-Sheet 3

INVENTORS.
JOSEPH R. HOOVER
GEORGE SUSSEX,
BY
J. K. Haskell
ATTORNEY.

MICROWAVE WIDE BAND INJECTION LOCK SYSTEM

Filed Oct. 2, 1964 4 Sheets-Sheet 4

INVENTORS.
JOSEPH R. HOOVER,
GEORGE SUSSEX,
BY J. K. Haskell
ATTORNEY 3,281,710
MICROWAVE WIDE BAND INJECTION LOCK SYSTEM Joseph R. Hoover, Encino, and George R. Sussex, Los Angeles, Calif., assignors to Hughes Aircraft Company, Culver City, Calif., a corporation of Delaware
Filed Oct. 2, 1964, Ser. No. 402,062
4 Claims. (Cl. 331—4)

This invention relates to a microwave wide band injection lock system and more particularly to a low noise microwave system operating in an injection lock mode and incorporating fully automatic electronic acquisition and tracking functions over a wide frequency range.

In the field of microwave energy production, the problem of frequency modulation (F.M.) noise is of great concern. F.M. noise is the plus and minus deviation in frequency from the tuned frequency of an oscillator. It is inherent to some extent in all oscillators. Thus, instead of having a very fine single spectral line in a frequency spectrum display, the output of a microwave oscillator exhibiting a substantial amount of F.M. noise will show a broad major spectral line plus sideband spectral lines of much lower magnitude. The sideband energy tends to cover up weak-received signals in a doppler radar receiver where either or both the receiver local oscillator and the transmitter power output has a relatively high F.M. noise content. This, of course, severely limits the range at which a target can be detected.

One method to obtain high power low noise microwave output energy is to multiply the low frequency output from a stable crystal oscillator and use the multiplied energy as a locking signal to synchronize the frequency of a high power backward-wave oscillator, a klystron oscillator or a voltage tuned magnetron oscillator. This method has been known to provide an F.M. noise level which approaches 90 db down from the desired energy as measured in a 1 kc. noise bandwidth. This method is not new and a discussion thereof may be found in an article published in the IRE Transactions on Microwave Theory and Techniques, July 1962, entitled "Injection Locking of Klystron Oscillators" by Richard C. Mackey.

The capability to closely reproduce a low power reference source at a high power level may be found to be very useful in the field of local oscillators in radar systems, input signals for cw. or pulse doppler radar transmitters or for test equipment applications. Also, this phenomenon can be utilized as a form of amplification as described in the referenced article by Mackey.

Generally, the use of injection lock to obtain low noise microwave power sources has been limited to narrow band, manually locked and tuned operation since systems incorporating acquisition and tracking functions have been found to have the disadvantage of being able to provide low noise operation only over a very narrow bandwidth, without manual adjustments.

From the foregoing, it should be evident that it would be highly desirable to provide a microwave injection lock system capable of low noise automatic acquisition and tracking over a wide frequency range.

It is therefore an object of the present invention to provide an improved microwave injection lock system.

It is another object of the invention to provide a microwave injection lock system capable of low noise operation over a wide frequency range.

It is still another object of the present invention to provide a low noise microwave injection lock system having automatic electronic acquisition and tracking functions.

These and other objects are achieved in a microwave wide band injection lock system comprising a means for receiving relatively low power locking signal energy. This energy is then coupled to a means for dividing the locking signal energy into first and second equal magnitude energy paths, comprising first and second waveguiding means, respectively. Included as part of the first energy path is a means for generating relatively high power locked signal energy which is phase-synchronized with the locking signal energy. Coupled to the second waveguiding means and included as part of the second energy path is a means for reflecting the locking signal energy and is dimensioned to substantially equalize the effective lengths of the two energy paths. Also, a microwave phase comparator means is coupled to both waveguiding means and is responsive to the locked signal energy in the first energy path and to the locking signal energy in the second energy path to provide error signal energy related to the phase difference between the incident locked and locking signal energy. Coupled to both the power means and to the phase comparator means is a means for electrically varying the frequency of the power means in response to the error signal. The output signal, which comprises a major portion of the locked signal energy, is provided by an output means coupled to the first waveguiding means.

The invention and specific embodiments thereof will be described hereinafter by way of example and with reference to the accompanying drawing, in which.

Figure 1:
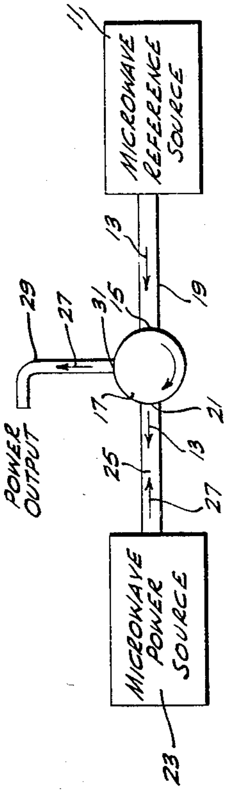
FIG. 1 is a block diagram of a basic injection lock technique.

Referring now to the drawings and more particularly to the basic injection lock system of FIG. 1, there is shown a microwave reference source 11 providing locking signal energy indicated by arrow 13. The reference source 11 may be any low level signal producing device such as a low powered, highly stable oscillator or a microwave amplifier which has amplified a received signal, the frequency of which is to be reproduced at a much higher power level.

The locking signal 13 is coupled from the reference source 11 to a first port 15 of a conventional microwave three port circulator 17 by appropriate waveguiding means 19. The locking signal 13 is in turn coupled out of a second port 21 of the circulator 17 to a microwave power source 23 through suitable waveguiding means 25. By the well-known phenomenon of injection locking as described in texts and articles such as the one aforementioned, the small injected locking signal will cause the free-running frequency of the properly adjusted microwave power source 23, such as a klystron or backward-wave oscillator, to become phase-synchronized to the locking signal 13 and thus provide locked signal energy indicated by arrow 27. The locked signal 27 is then coupled back through the waveguiding means 25 to the second port 21 of the circulator 17 where it is, in turn, coupled to an output waveguiding means 29 from a third port 31. A supplementary phase-lock loop (not shown) can be added to provide frequency acquisition and tracking functions to thereby eliminate manual adjustments. However, the ability of such a system to provide low noise operation is extremely limited, without further manual adjustment, to a narrow frequency band—generally about 0.1% at microwave frequencies. However, it has been found that in order to establish phase-lock initially and to maintain phase-lock over a wide frequency range, proper phase relationships between the locking signal energy 13 and the locked signal energy 27 must be provided at a phase comparing device of the loop.

Figure 2:
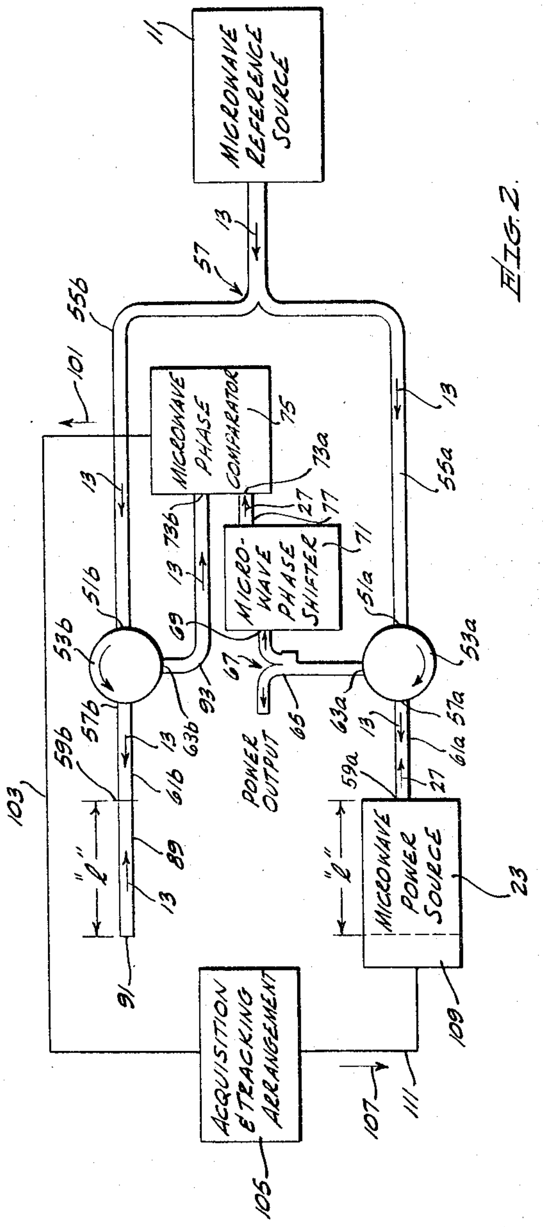
FIG. 2 is a block diagram illustrating a microwave wide band injection lock system according to the present invention.

The present invention accomplishes this by considering the microwave power source as a length of waveguide with a reflecting plane at distance "*l*" from its entrance. Such a system is illustrated in FIG. 2. Here, there is shown one half of the locking signal energy 13 from the microwave reference source 11 being coupled to a first port 51*a* of a first conventional three port ferrite type circulator 53*a* by means of a waveguide 55*a* and a conventional short slot hybrid power divider 57. The locking signal 13 is then coupled from a second port 57*a* of the circulator 53*a* to the entrance 59*a* of the microwave power source 23 through a waveguide 61*a*. The waveguide 61*a*, in turn, conveys the locked signal 27 from the power source 23 to the second port 57*a* of the circulator 53*a*. The locked signal 27 is then coupled from a third port 63*a* through a waveguide 65 and a conventional 20 db power coupler 67 to an input terminal 69 of a conventional microwave 0–360° phase shifter 71 whereat any desired phase shift may be introduced to the locked signal 27 before it is coupled to a first input terminal 73*a* of a microwave phase comparator 75 by means of a waveguide 77.

The other half of the locking signal energy 13 is coupled from the power divider 57 through a waveguide 55*b* to a first port 51*b* of a second conventional three port circulator 53*b*. The locking signal 13 is then coupled from a second port 57*b* of the circulator 53*b* through a waveguide 61*b* to an energy reflecting element 89 having a length "*l*" from its entrance 59*b* to its adjustable reflecting plane 91. After being reflected from the reflecting plane 91, the locking signal 13 is conveyed back through the waveguide 61*b* to the second port 57*b* of the circulator 53*b* from where it is conveyed through a third port 63*b* to a second input terminal 73*b* of the phase comparator 75 through a waveguide 93.

The function of the conventional phase comparator 75 is to produce an error signal represented by arrow 101 whenever there is a difference in phase between the energy incident on its input terminals 73*a* and 73*b*. The magnitude of the error signal is governed by the amount of difference between the phases of the compared energies. The error signal 101 is coupled by means of cable 103 to a conventional acquisition and tracking arrangement 105 which, in turn, provides a related acquisition and tracking signal represented by arrow 107. The later signal is then coupled to an electrical frequency determining portion 109 of the microwave power source 23 through a cable 111.

By considering the microwave power source 23 as a length of waveguide having a reflecting plane at a distance "*l*" from its entrance 59*a*, the energy arriving at the input terminals 73*a* and 73*b* of the comparator 75 can be made to have simultaneous wave fronts by making the path length of the energy from the reference source 11 to the first input terminal 73*a* of the phase comparator 75 (as seemingly reflected by the power source 23) equal to the path length of the energy from the reference source 11 as reflected in the energy reflecting element 89 to the second input terminal 73*b* of the phase comparator 75. Accordingly, those elements having the same reference numeral but designated "*a*" and "*b*" should be of the same type and substantially the same dimensions. Also, the waveguide 93 should have substantially the same length as waveguides 65, 69 and 77 along with the effective length of the phase shifter 71 at, for example, its zero phase shift setting. In this way, the phase relationship of the energies arriving at the input terminals 73*a* and 73*b* of the phase comparator 75 will be substantially constant over a wide range of frequency whenever the locking signal 13 and the locked signal 27 are in phase.

One method to determine the value of the length "*l*" of the reflecting element 89 is by noting the phase shift compensation (from phase shifter 71) required to hold phase-lock as the frequency of the locking signal 13 is changed over the desired range. The position of the reflecting plane 91 is then adjusted until no compensation is required over the entire frequency range. Once this length is determined, the element 89 may be replaced by a reflecting element of correct length which has a fixed reflecting plane and the phase shifter 71 may be left in a fixed position.

Figure 3:
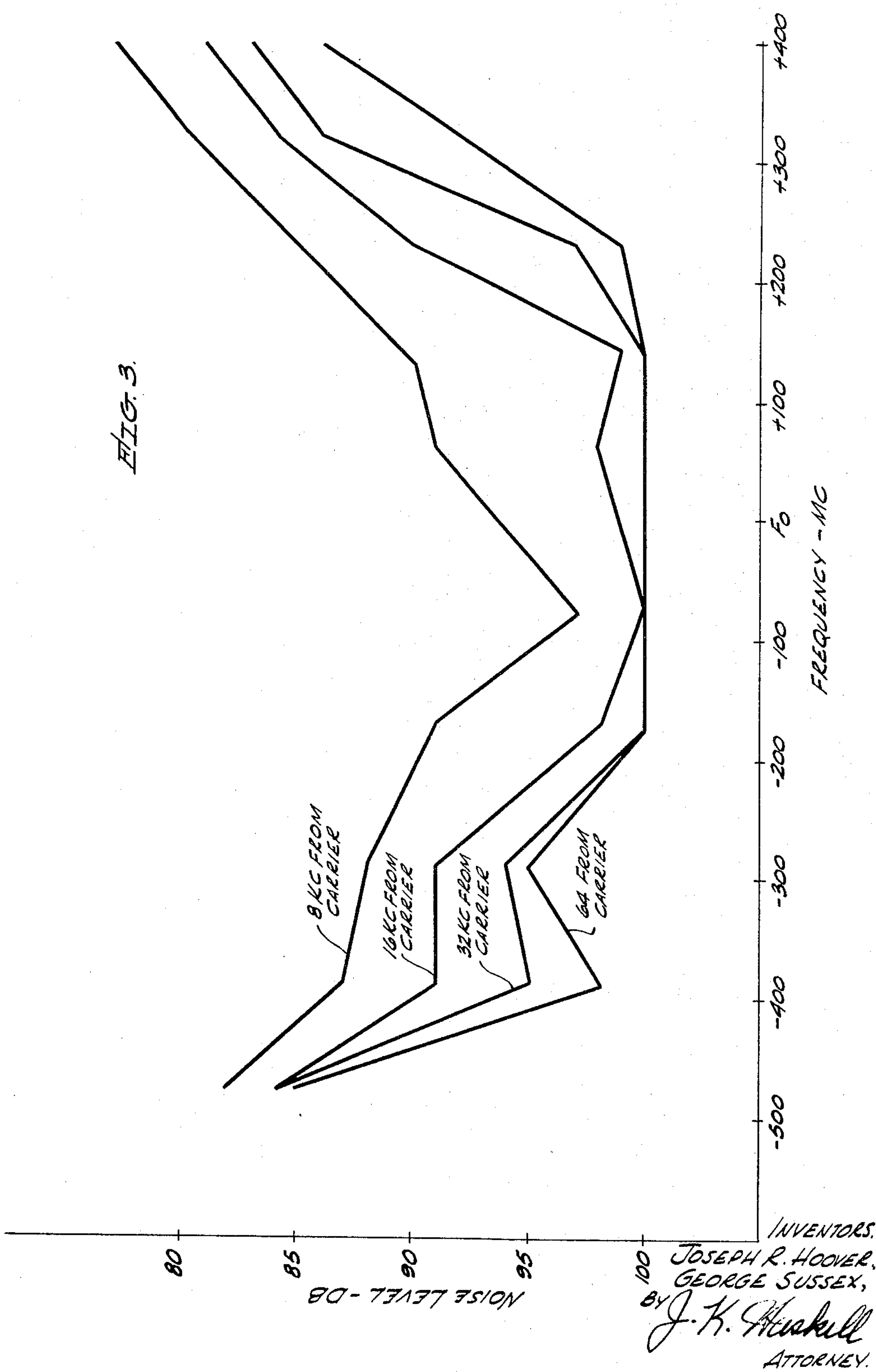
FIG. 3 is a graph comparing sideband noise level versus operating frequency for a system constructed according to the present invention as shown in FIG. 2.
Figure 4:
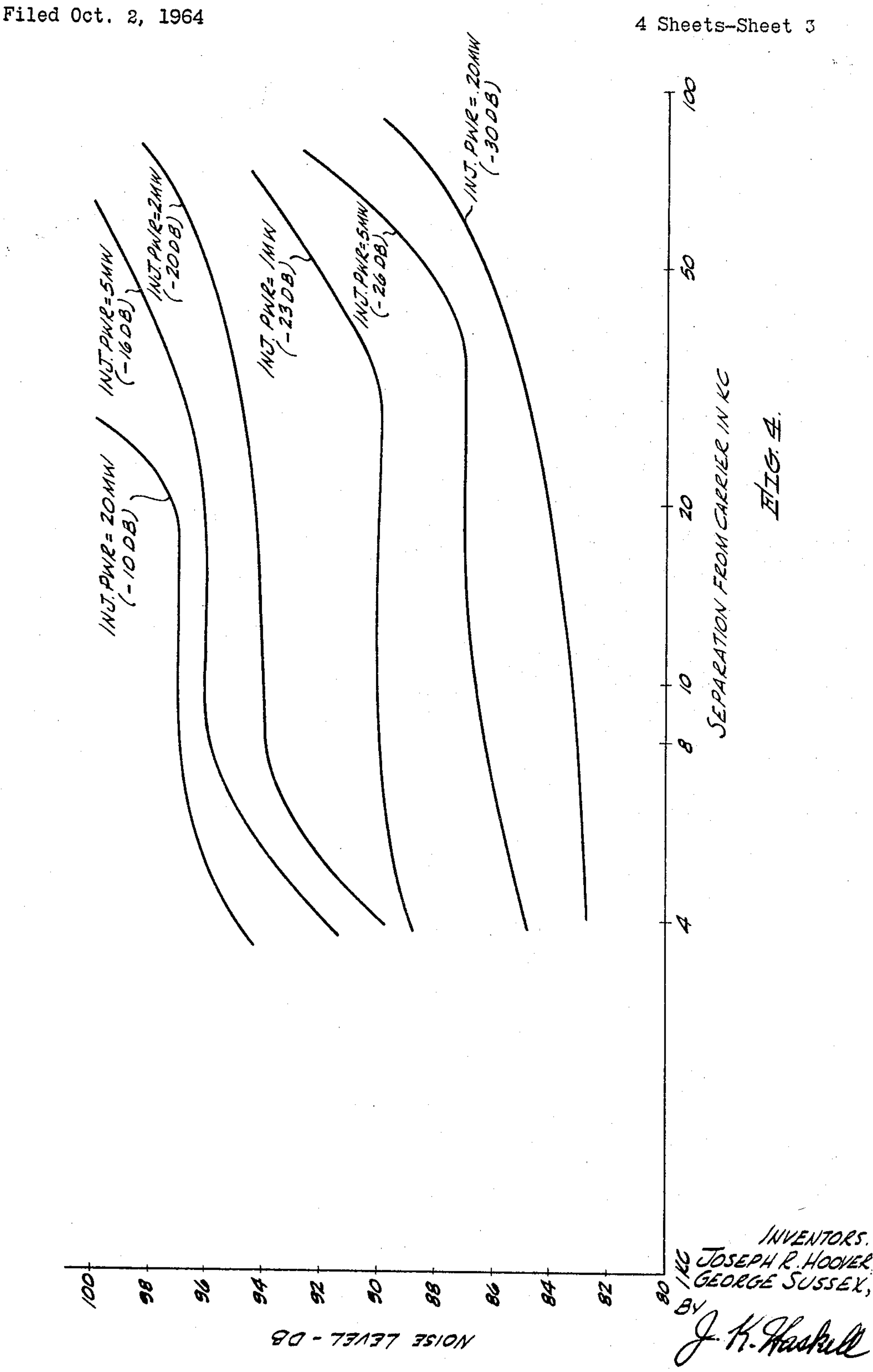
FIG. 4 is a graph comparing sideband noise level versus frequency as a function of injection power for the system shown in FIG. 2.

A system as shown in FIG. 2 has been constructed and tested and utilizes a backward-wave oscillator as the power source 23 with outstanding results. This system has a useful low noise bandwidth of greater than 7% at microwave frequencies. FIG. 3 is a graph illustrating the sideband noise level versus frequency, while FIG. 4 shows how the injection power level effects the noise level of the system constructed according to FIG. 2.

Figure 5:
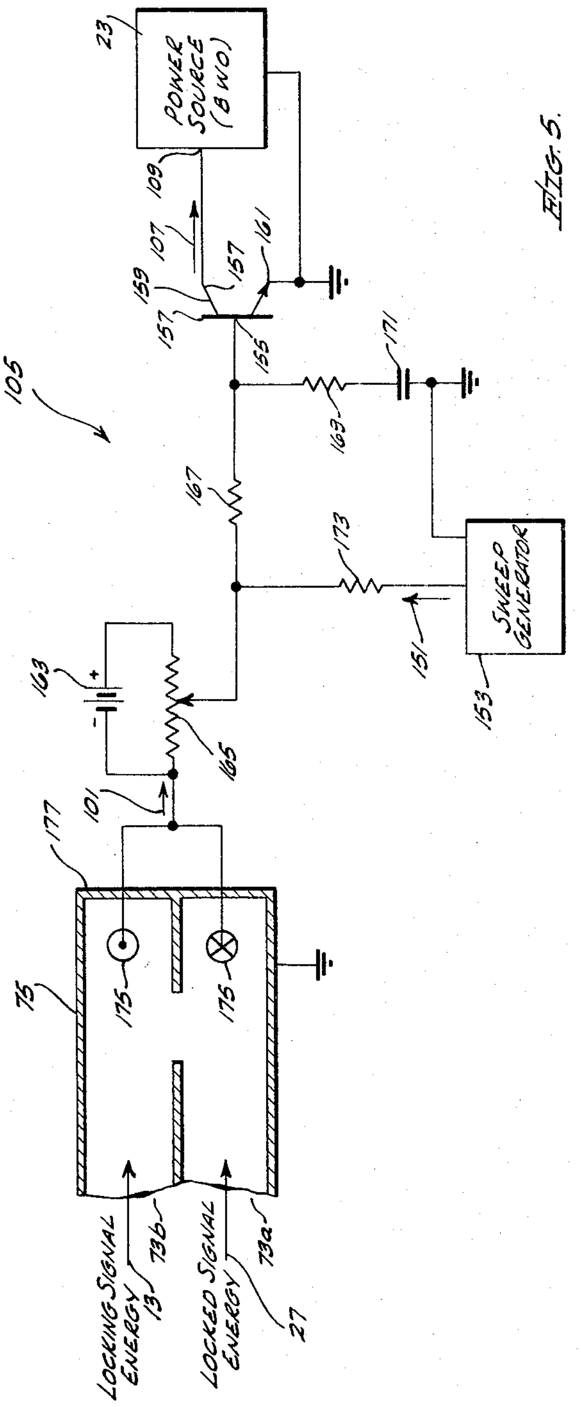
FIG. 5 is a schematic diagram of the phase comparator and acquisition and tracking circuitry used in the system constructed according to FIG. 2.

FIG. 5 shows the circuit used in the acquisition and tracking arrangement 105. The error signal output 101 from the phase comparator 75 is coupled to the acquisition, etc. arrangement 105, which, in turn, provides the acquisition and tracking signal 107 which is coupled to the frequency determining portion 109 of the power source 23. In the preferred embodiment, the power source 23 is a backward-wave oscillator (B.W.O.), the cathode of which is the portion 109. A B.W.O. is preferred over a klystron oscillator because of the former's capability of being electrically controlled to oscillate over a very wide frequency range.

FIG. 5 illustrates one of many possible circuits which may be used as the arrangement 105. Along with the error signal 101 from the phase comparator 75, a sweep signal 151 generated by a sweep generator 153 may be coupled to the base terminal 155 of an npn transistor 157 such as a type 2 N 699. The collector 159 of the transistor 157 is connected to the frequency determining portion 109 (cathode of B.W.O.) of the power source 23 and the emitter 161 is connected to the common ground. Thus, either or both of these signals will, when present at the base terminal 155, be amplified by the transistor 157 which provides the signal 107. Bias voltage for the transistor 157 is provided by a parallel 6 volt battery 163-potentiometer 165 combination.

It should readily be recognized from FIG. 2 that the combination of the phase comparator 75, the acquisition and tracking arrangement 105, and the power source 23 comprise a low response phase-locked loop. In a conventional manner, the phase-locked loop is stabilized by a compensation network comprising a lag term filter resistor 167, a lead term filter resistor 169 and a filter capacitor 171. Resistor 167 and capacitor 171 provide high frequency attenuation to the loop, while resistor 169 and capacitor 171 provide a lead term for loop stability.

In order to isolate the loop from the low impedance output of the sweep generator 153, an isolation resistor 173 is connected between the generator 153 and the junction of the potentiometer 165 and resistor 167.

As seen in FIG. 5, the phase comparator 75 may be a conventional 3 db short slot hybrid coupling structure having two crystal diodes 175 mounted within and near the end wall 177 thereof. The diodes 175 may be type 1 N 23 diodes and are connected with reversed polarities so that an error signal 101 is generated when the locking signal 13 and the locked signal 27 are not exactly in phase. The polarity of the error signal 101 will be dependent upon which of the two signals incident on the phase comparator 75 leads the other. The relative phase of the signals 13 and 27 is adjusted by the phase shifter 71 for optimum phase comparator operation. Thus, if the locked signal energy 27 at the input terminal 73*a* leads slightly the locking signal energy 13 at the terminal 73*b*, the error signal 101 produced will be of such polarity to cause the B.W.O. 23 to change its oscillating frequency in the correct direction to nullify this phase difference. In this way, tracking is accomplished.

On the other hand, if these two signals are not sufficiently close in phase initially or the locking signal energy is shifted so quickly that tracking cannot be accomplished, the acquisition function incorporating the sweep generator 153 is utilized. In this case, the sweep generator 153 is energized, by conventional circuitry not shown, to provide the sweep signal 151 which causes the B.W.O. to sweep in frequency across its entire predetermined frequency range until the phase comparator 75 senses that the locking and locked signals are again in phase. At this point, the B.W.O. is again injection locked to the locking signal. Once acquisition is accomplished, the sweep generator may be disabled and the tracking function provided by the phase comparator and associated circuitry as described above. The signal generator 153 may also be left energized in the circuit but with its output maintained at such a level that it will be effective to change the frequency of oscillation of the B.W.O. only when there is no injection lock.

The following table identifies various components used in constructing the device shown in FIG. 5.

*Table*

Resistor 167—10,000 ohms, ½ watt fixed carbon
Resistor 169—33 ohms, ½ watt fixed carbon
Resistor 173—47,000 ohms, ½ watt fixed carbon
Capacitor 171—47 microfarad, tantalytic The phase shifter 71 actually utilized to provide the data for FIGS. 3 and 4 is a commercially available one consisting of two rectangular to circular waveguide sections with a circular waveguide midsection. The midsection contains a vane assembly to provide a phase shift and is gear driven from an external knob to provide a continuous phase shift of ±360°.

From the foregoing, it will be seen that there is achieved a low noise microwave injection lock system providing automatic electronic acquisition and tracking functions.

In practicing the invention, any device exhibiting the properties of the various conventional device specifically described may be substituted therefore. For example, a four port circulator properly terminated for three port operation may be substituted for any or all of the three port circulators described.

Although a specific embodiment has been herein illustrated, it will be appreciated that other organizations of the specific arrangement shown may be made within the spirit and scope of the invention.

Accordingly, it is intended that the foregoing disclosure and showings made in the drawings shall be considered only as illustrations of the principles of this invention and are not to be construed in a limiting sense.

What is claimed is:

1. A microwave wide band injection lock system, comprising: microwave reference input means for providing relatively low power locking signal energy; power divider means coupled to said input means for dividing the locking signal energy into first and second equal magnitude energy paths; first and second waveguiding means coupled to said power divider means for propagating locking signal energy in said first and second energy paths, respectively; microwave power means coupled to said first waveguiding means and being part of said first energy path, said power means being responsive to said locking signal energy to provide to said first energy path relatively high power phase-synchronized locked signal energy; energy reflecting means coupled to said second waveguiding structure and being part of said second energy path, said reflecting means being dimensioned to substantially equalize the lengths of said energy paths; microwave phase comparator means coupled to said first and second waveguiding structures and being responsive to the locked signal energy in said first energy path and to said locking signal energy in said second energy path to provide error signal energy related to the phase difference between the incident locked signal energy and locking signal energy; means coupled to said power means and to said phase comparator means for electrically varying the frequency of said power means in response to said error signal; and output means coupled to said first waveguiding structure for providing as an output signal a major portion of said locked signal energy.

2. A microwave wide band injection lock system, comprising: microwave reference input means for providing relatively low power locking signal energy; power divider means coupled to said input means for dividing the locking signal energy into first and second equal magnitude energy paths; first and second waveguiding means coupled to said power divider means for propagating locking signal energy in said first and second energy paths, respectively; microwave power means coupled to said first waveguiding means and being part of said first energy path, said power means being responsive to said locking signal energy to provide to said first energy path relatively high power phase-synchronized locked signal energy; variable phase shifter means coupled to one of said waveguiding means for varying the phase of the energy propagating in the corresponding energy path; energy reflecting means coupled to said second waveguiding structure and being part of said second energy path, said reflecting means being dimensioned to substantially equalize the lengths of said energy paths; microwave phase comparator means coupled to said first and second waveguiding structures and being responsive to the locked signal energy in said first energy path and to said locking signal energy in said second energy path to provide error signal energy related to the phase difference between the incident locked signal energy and locking signal energy; means coupled to said power means and to said phase comparator means for electrically varying the frequency of said power means in response to said error signal; and output means coupled to said first waveguiding structure for providing as an output signal a major portion of said locked signal energy.

3. A microwave wide band injection lock system, comprising: a microwave reference source for providing locking signal energy at a relatively low power level; a power divider coupled to said reference source for equally dividing said locking energy into said first and second energy paths; a first microwave circulator coupled to said first energy path; a microwave power source coupled to said first circulator and a part of said first energy path, said power source including an electronic frequency determining portion and being responsive to said locking signal energy to provide to said first energy path locked signal energy synchronized in phase with and of relatively higher power than said locking signal energy; an energy reflecting element; a second microwave circulator coupled to said energy reflecting element and to and part of said second energy path, said energy reflecting element having a dimension to substantially equalize the lengths of said energy paths; a microwave phase comparator coupled to said first and second energy paths and responsive to the energy incident thereon from said energy paths to provide error signal energy corresponding to a phase comparison of said incident energy; a sweep acquisition and tracking arrangement coupled to said phase comparator and to said frequency determining portion of said power source and responsive to said error signal energy to provide related acquisition and tracking signal energy to said frequency determining portion; and microwave output means including a 20 db power coupler coupled to said first energy path for providing a relatively high energy output signal.

4. A microwave wide band injection lock system, comprising: a microwave reference source for providing locking signal energy at a relatively low power level; a short slot hybrid power divider coupled to said reference source for equally dividing said locking energy into first and second energy paths; a first microwave circulator coupled to said first energy path; a microwave B.W.O. power source coupled to said first circulator and a part of said first energy path, said power source including an electronic frequency determining portion and being responsive to said locking signal energy to provide to said first energy path locked signal energy synchronized in phase with and of relatively higher power than said locking signal energy; a variable phase shifter coupled to said first circulator and being part of said first energy path for varying the phase of the locked signal energy; an energy reflecting element including an adjustable reflecting plane; a second microwave circulator coupled to said energy reflecting element and to and part of said second energy path, said energy reflecting element having an effective length to substantially equalize the lengths of said energy paths; a microwave phase comparator coupled to said first and second energy paths and responsive to the energy incident thereon from said energy paths to provide error signal energy corresponding to a phase comparison of said incident energy; a sweep acquisition and tracking arrangement coupled to said phase comparator and to said frequency determining portion of said power source and responsive to said error signal energy to provide related acquisition and tracking signal energy to said frequency determining portion; and microwave output means including a 20 db power coupler coupled to said first energy path for providing a relatively high energy output signal.

No references cited.

ROY LAKE, *Primary Examiner.*

J. KOMINSKI, *Assistant Examiner.*